United States Patent
Hettlage

(10) Patent No.: US 6,806,599 B1
(45) Date of Patent: Oct. 19, 2004

(54) ROTARY ACTUATING DRIVE AND ROTARY SWITCH

(75) Inventor: Eckart Hettlage, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/890,831
(22) PCT Filed: Oct. 30, 1999
(86) PCT No.: PCT/DE99/03468
§ 371 (c)(1), (2), (4) Date: Dec. 23, 2001
(87) PCT Pub. No.: WO00/46909
PCT Pub. Date: Aug. 10, 2000

(30) Foreign Application Priority Data

Feb. 4, 1999 (DE) .......................... 199 04 469

(51) Int. Cl.⁷ .............................................. H02K 7/00
(52) U.S. Cl. ..................... 310/68 B; 310/181
(58) Field of Search .............................. 310/68 B, 181, 310/119, 49 R

(56) References Cited

U.S. PATENT DOCUMENTS

| | | | |
|---|---|---|---|
| 3,984,711 A | | 10/1976 | Kordik ....................... 310/49 R |
| 4,607,204 A | * | 8/1986 | Setoya ........................ 318/696 |
| 4,755,732 A | * | 7/1988 | Ando ........................... 318/696 |
| 4,803,389 A | * | 2/1989 | Ogawa et al. ............ 310/49 R |
| 4,983,867 A | * | 1/1991 | Sakamoto .................. 310/49 R |
| 5,117,144 A | * | 5/1992 | Torok .......................... 310/269 |
| 5,345,131 A | * | 9/1994 | Torok .......................... 310/181 |
| 5,548,173 A | * | 8/1996 | Stephenson ................. 310/181 |
| 5,616,974 A | * | 4/1997 | Yamada ..................... 310/68 B |
| 6,028,377 A | * | 2/2000 | Sakamoto ................. 310/49 R |
| 6,091,170 A | * | 7/2000 | Mayes et al. ............. 310/68 B |
| 6,133,664 A | * | 10/2000 | Torok et al. ................. 310/181 |
| 6,153,953 A | * | 11/2000 | Isozaki et al. ............ 310/49 R |
| 6,204,587 B1 | * | 3/2001 | Torok et al. ................. 310/181 |

FOREIGN PATENT DOCUMENTS

| | | |
|---|---|---|
| DE | 31 04 969 | 8/1982 |
| EP | 0 635 929 | 1/1995 |
| JP | 10 178 770 | 6/1998 |

* cited by examiner

Primary Examiner—Dang Le
(74) Attorney, Agent, or Firm—Kenyon & Kenyon

(57) ABSTRACT

To simplify the design of a rotary actuator, in particular for an "R"-type waveguide switch, having a permanently magnetized rotor and a plurality of stator windings surrounding the rotor in a rim-like fashion, for generating magnetic fields which place the rotor in one of a first plurality of positions, it is proposed to finish the actuator with elements for exerting a corrective torque on the rotor, the elements placing the rotor, in the currentless state of the stator windings, in a target position of a second plurality of positions, each position of the first plurality having assigned to it a target position.

12 Claims, 3 Drawing Sheets

US 6,806,599 B1

ROTARY ACTUATING DRIVE AND ROTARY SWITCH

FIELD OF THE INVENTION

The present invention relates to a rotary actuator having a permanently magnetized rotor and a plurality of stator windings surrounding the rotor in a rim-like fashion, for generating magnetic fields that place the rotor in one of a first plurality of positions.

BACKGROUND INFORMATION

Rotary actuators can be used as the drive for rotary switches, for example, an "R"-type waveguide switch in satellite technology.

Currently, stepping motors are generally used as actuators for purposes of this type, such as are described in European Patent No. 0 635 929. However, stepping motors have a number of characteristics that make them not seem optimally suited as actuators for rotary switches. Stepping motors are generally designed to generate a large torque that is distributed as uniformly as possible in the course of one rotation of the motor shaft, the torque making it possible to smoothly drive a mechanism that is braked using friction. This requires a minute staggering of the stator windings in the circumferential direction around the rotor, necessitating a multiplicity of terminal connections that are cumbersome to connect to wires. FIG. 5a depicts an example of a rim-like arrangement of stator windings, which can place an (undepicted) rotor in four positions, each offset by 45° with respect to the others. Stator windings 1 through 4 are divided here into two diametrically opposite segments 1a, 1b, ... 4a, 4b. The total of eight segments are mounted on a ring core 5, which lies in the plane of the Figure and perpendicular to rotational axis 6 of an (undepicted) rotor. FIG. 5b depicts the alignments of magnetic fields $B_1 \ldots B_4$, which are obtained by sending current through segment pairs 1a, 1b ... 4a, 4b. These vectors indicate the position in which the rotor is placed in the interior space of ring core 5. Each neighboring vector has an angular distance from adjacent vectors of 45°. By sending current through the winding segments having the opposite sign, vectors can also be generated in the opposite direction, but they generally have no practical significance in applications of the rotary actuator for setting a rotary switch.

The large number of necessary segments makes it difficult to achieve a compact design of the actuator and renders its manufacture time-consuming and expensive.

From Japanese Laid-Open Patent Application No. 10 178 770, and the related English abstract published in Patent Abstracts of Japan, Volume 1998, No. 11, Sep. 30, 1998, a motor, in particular a stepping motor, is known which has a controllable stop position. This motor has a permanently magnetized rotor and a plurality of stator windings surrounding the rotor in a rim-like fashion, for generating magnetic fields for the purpose of placing the rotor in a plurality of positions. To place the rotor in specific positions, permanent magnets are provided between the stator windings.

SUMMARY OF THE INVENTION

According to the present invention, in a rotary actuator of the type cited above, elements are provided for exerting a corrective torque on the rotor, the elements, in the currentless state of the stator windings, placing the rotor in a target position from a second plurality of positions, a target position being assigned to each position of the first plurality. Therefore, whereas in conventional rotary actuators the stator windings themselves must place the rotor in a target position, in the actuator according to the present invention, this task is taken on by the elements for exerting a corrective torque. Therefore, there no longer exists the requirement that the stator windings must have an arrangement having double symmetry in order to be able to set n different positions in an angular range of 180°. Their arrangement can therefore be simpler, a high degree of symmetry in any case in the elements for exerting the corrective torque. But since the latter is smaller than the torque to be exerted by the stator windings and since the range of the latter can be significantly smaller, it is possible that the elements for exerting the corrective torque can also be significantly smaller and more compact.

In particular, these elements can be permanent magnets and therefore do not need to be wired. Thus according to the present invention, it is possible to arrange the stator windings about the rotor in an unpaired fashion, which cuts in half the number of contacts that are needed for the power supply of the stator windings, and that must be soldered or connected in some other way. The possibility of using a number of stator windings that is smaller than the number of the first positions makes possible a further simplification of the design.

According to one preferred embodiment, the rotary actuator has four first positions and three stator windings.

Further features of the rotary actuator according to the present invention and of a rotary switch that is equipped with an actuator of this type can be derived from the description of the exemplary embodiments below.

BRIEF DESCRIPTION OF THE DRAWINGS

FIG. 5b depicts the orientation of the magnetic fields generated by the stator windings in FIG. 5a.

DETAILED DESCRIPTION

Figure 1A:
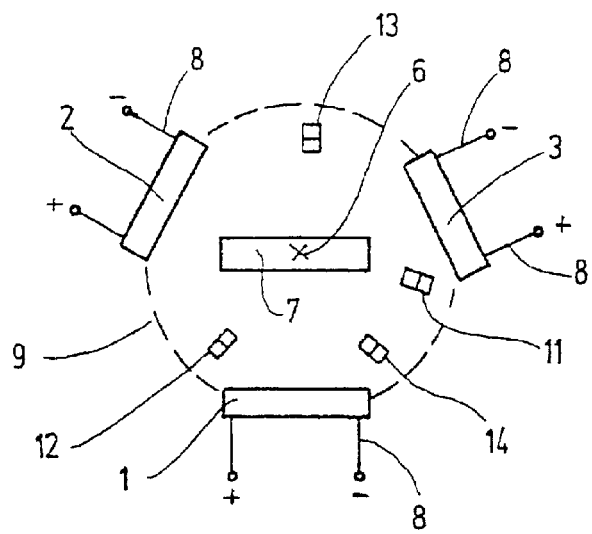
FIG. 1a schematically depicts an exemplary embodiment of a rotary actuator according to the present invention having three stator windings and four first positions.
Figure 1B:
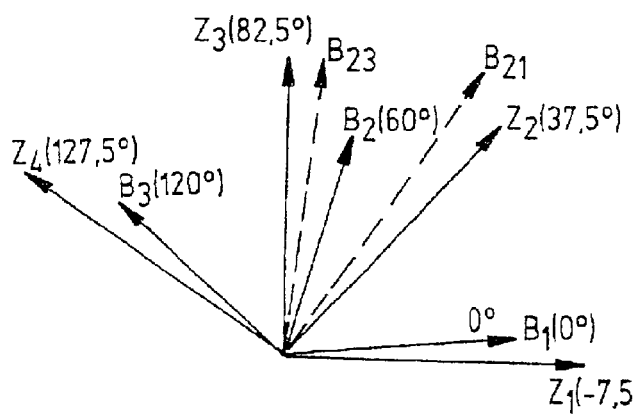
FIG. 1b depicts the vectors that correspond to the magnetic fields generated only by the stator windings and to the target positions of the rotary actuator.

FIG. 1a depicts the components of a rotary actuator according to the present invention. The actuator includes three stator windings 1, 2, 3, which are arranged in a rim-like fashion, symmetrically about an axis 6 that is perpendicular to the plane of the Figure, at an angular distance in each case of 120°. The stator windings can be selectively connected to an (undepicted) power supply, the polarity of power supply terminals 8 of the stator windings being selected so that windings 1 and 3 generate a magnetic field that is equally oriented with respect to an imaginary circumferential line 9, and stator winding 2 generates a magnetic field having the opposite orientation. Thus as a result of a current being sent through stator windings 1, 2, 3, magnetic fields $B_1$, $B_2$, $B_3$, having the orientations depicted in FIG. 1b, are obtained, which are offset by 60° with respect to each other.

A rotor 7, which for the sake of simplicity is depicted in FIG. 1a as a bar magnet, can rotate freely about axis 6 under the influence of the magnetic fields generated by stator windings 1, 2, 3; in FIG. 1a, it is depicted in the position which corresponds to the case in which only stator winding 1 is supplied with current.

Rotor 7 can adopt other positions corresponding to the orientation of magnetic fields $B_2$, $B_3$, if one of windings 2, 3 is supplied with current.

Four auxiliary magnets 11, 12, 13, 14 are mounted so as to be radially oriented at different locations outside the area covered by rotor 7 in its rotary motion. A first auxiliary magnet 11 is mounted in a position which shifts the orientation of magnetic field $B_1$ by 7.5° in the clockwise direction. Auxiliary magnet 11 has a polarity such that it exerts an attractive force on rotor 7 in the position depicted in FIG. 1a adopted under the influence of magnetic field $B_1$. If the power supply to winding 1 is terminated, rotor 7 under the influence of auxiliary magnet 11 rotates to a target position $Z_1$ (see FIG. 1b), in which it is directly facing auxiliary magnet 11.

A further auxiliary magnet 14 is arranged so as to be offset with respect to auxiliary magnet 11 by 45° in the clockwise direction and to have a polarity that is opposite to the latter's. Under the influence of a magnetic field generated by winding 3, rotor 7 adopts a position corresponding to vector $B_3$ in FIG. 1b, if this magnetic field is switched off, rotor 7 under the influence of auxiliary magnet 14 rotates 7.5° to a target position, which corresponds to vector $Z_4$ in FIG. 1b. Vectors $Z_1$, $Z_4$ constitute an angle of 135°.

Two further auxiliary magnets 12, 13 are arranged so that they can maintain rotor 7 in target positions $Z_2$, $Z_3$. Four target positions $Z_1$, $Z_2$, $Z_3$, $Z_4$ are offset by 45° with respect to each other.

Auxiliary magnets 11, 12, 13, 14 are dimensioned so that they have the capacity to pull the rotor to themselves from an angular distance of up to roughly +/−20°.

Auxiliary magnets 11, 13, on the one hand, and 12, 14, on the other hand, have different polarities with respect to the radial direction and cooperate with different poles of rotor 7. The influence of each of them can be supported by an (undepicted in FIG. 1a) second auxiliary magnet situated diametrically opposite. If the rotary actuator has four target positions, as in the case described here by way of example, there are therefore eight locations at which auxiliary magnets can be arranged. However, it is sufficient if for every target position only one of these two locations is occupied. Preferably, as is depicted in FIG. 1a, the one of the two locations is occupied which is left vacant by a stator winding, because this makes the more compact design possible.

Figure 3:
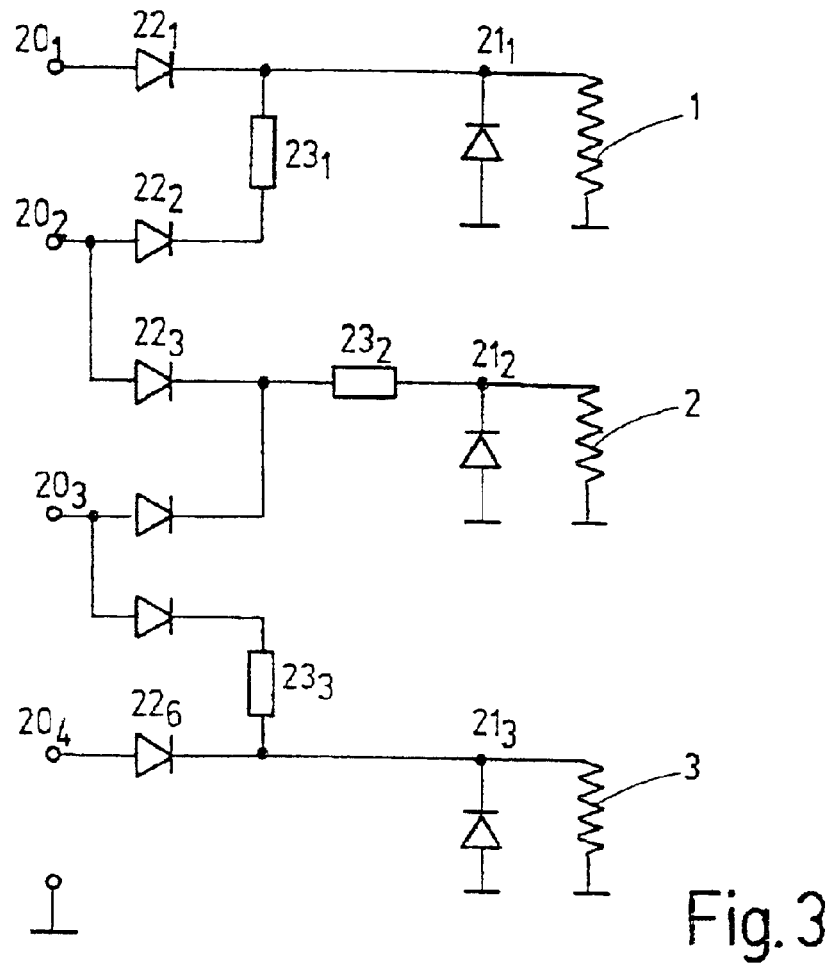
FIG. 3 depicts a network having four inputs and three outputs for supplying the stator windings with current corresponding to the four first positions.

As can be seen in FIG. 1b, vector $B_2$ of the magnetic field generated by stator winding 2 lies precisely on the line bisecting the angle between two target positions $Z_3$ and $Z_2$. Therefore, it is not possible to set two target positions $Z_2$ or $Z_3$, by one of the stator windings being temporarily charged with current and rotor 7 then being left to the influence of the auxiliary magnets, which pull it into the desired target position. For this reason, three stator windings 1, 2, 3 are advantageously provided with current via a network, as depicted in FIG. 3. The network has four inputs $20_1$ through $20_4$ and three outputs $21_1$ through $21_3$. Inputs $20_1$ and $20_4$ make it possible for a current to flow via a diode $22_1$, or $22_3$, to winding 1, or 3, respectively. If one of these inputs is supplied with current, rotor 7 as a consequence adopts a first position, which corresponds to the orientation of a magnetic field $B_1$, or $B_3$. If input $20_2$ is supplied with current, one part of the current flows via a diode $22_3$ to winding 2 and the rest of the current flows via a diode $22_2$ and a resistor $23_1$ to winding 1. The magnetic fields generated by windings 1, 2 overlap each other in a field $B_{21}$, whose vector is depicted in FIG. 1b by a dotted line. As a consequence, if input $20_2$ is supplied with current, rotor 7 adopts a first position corresponding to field $B_{21}$, from which, if the power supply is switched off, it can reliably be pulled into target position $Z_2$ by corresponding auxiliary magnet 12.

If the choice of the resistance value of resistor $23_1$ is suitable, the angular distance between $B_{21}$ and $Z_2$ can be made as small as desired, or the two positions can be brought into agreement.

By analogy to input $20_2$, input $20_3$ is connected via diode $22_4$ to winding 2 and via diode $22_5$ and a resistor $23_3$ to winding 3, so that a current that is applied to the network at input $20_3$ is distributed over windings 2, 3 and results in a superimposed magnetic field $B_{21}$, as is depicted in FIG. 1b by a dotted line.

In this manner, by one of inputs $20_1$ through $20_4$ of the network in FIG. 3 being selectively charged with current, it is possible to place rotor 7 in one of a plurality of first positions and subsequently, under the influence of auxiliary magnets 11 through 14, to cause it to pass to a target position, which can be offset with respect to the first position by a small angle.

Optionally, a resistor $23_3$ can be arranged upstream of output $21_2$ that is assigned to winding 2, to make the resistance of the arrangement made up of network and windings the same for all inputs $20_1$ through $20_4$ of the network.

Figure 2:
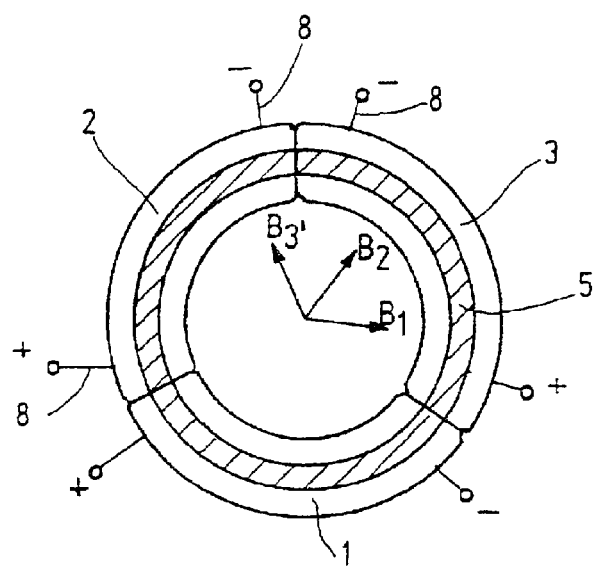
FIG. 2 depicts a second exemplary embodiment of a rim-like arrangement of stator windings of a rotary actuator according to the present invention.
Figure 4:
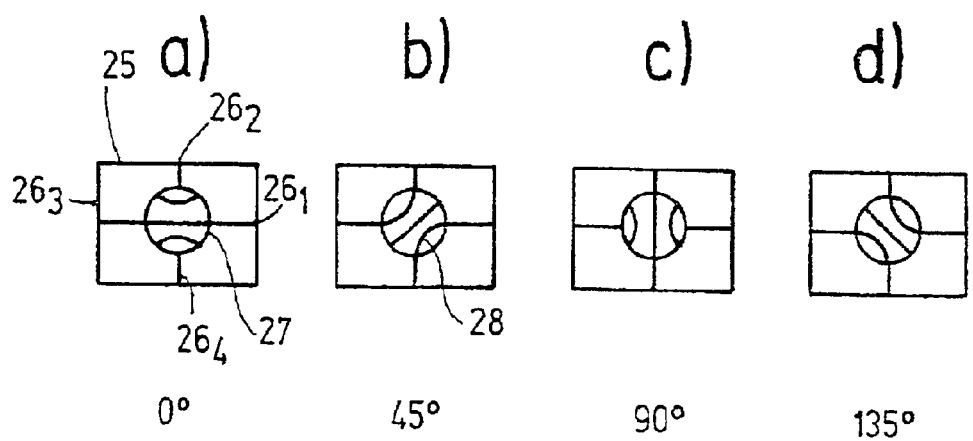
FIG. 4 schematically depicts an "R"-type waveguide switch in four different switching positions.
Figure 5A:
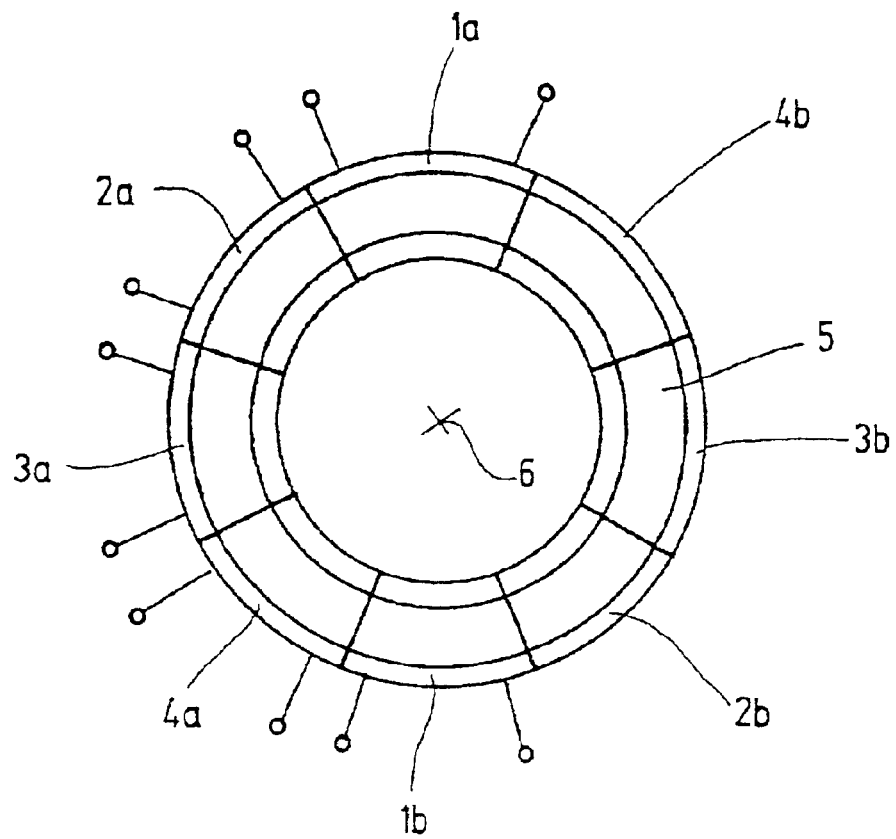
FIG. 5a depicts a conventional arrangement of stator windings.
Figure 5B:
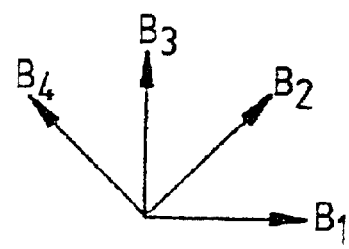

One preferred application of the rotary actuator is the drive of an "R"-type switch 25, as depicted in FIG. 4 in different switching positions. This switch 25 has a frame having four input/outputs $26_1$ through $26_4$ and an adjusting body 27 that rotates in the frame. Adjusting body 27 is coupled to the rotor of an actuator, as is described with regard to FIG. 1 and FIG. 2, and can therefore be adjusted among four positions, which are depicted in parts a through d of FIG. 4.

Adjusting body 27 contains three channels 28, which in the various switching positions are connected in each case to different input/outputs $26_1$ . . . $26_4$. In three of the four switching positions, any input/output, for example $26_1$, is connected in each case with one of the three other outputs $26_2$ through $26_4$, and in a fourth switching state it is disconnected.

These "R"-type switches, especially "R"-type waveguide switches, in which the input/outputs and the channels are waveguide for high frequency signals, are used especially in space travel for the redundancy switches in payloads.

It is obvious that the rotary actuator that is described above specifically for the case of three stator windings and four target positions can also be applied for other numbers of stator windings and positions.

In addition, magnetic fields such as magnetic fields $B_1$, $B_2$ and $B_3$ in FIG. 1b, which define the first positions of the rotor, do not necessarily have to be generated by one single stator winding. Thus, for example, in the case of FIG. 2, if one of the stator windings, for example winding 2, is supplied with a current in accordance with the signs indicated at their terminals 8, it is conceivable, in order to generate field $B_2$, to simultaneously supply current to stator windings 1 and 3 in series with each other and parallel to winding 2, in accordance with the signs indicated at terminals 8 of windings 1 and 3, so as, in this manner, to strengthen the magnetic field in the interior space of ring core 5, to which rotor 7 is exposed.

What is claimed is:

1. A rotary actuator, comprising:

a permanently magnetized rotor;

a plurality of stator windings surrounding the permanently magnetized rotor in a rim-like fashion and for generating a magnetic field, the stator windings placing the permanently magnetized rotor in one of a first plurality of positions, wherein the stator windings are coplanar and arranged so as to be unpaired;

an arrangement for exerting a corrective torque on the permanently magnetized rotor, the arrangement for exerting the corrective torque, in a currentless state of the stator windings, placing the permanently magnetized rotor in a target position of a second plurality of positions, each position of the first plurality of positions having assigned thereto a corresponding one of the second plurality of positions as the target position; and a network having n inputs and m outputs, n being a number of the first plurality of positions and m being a number of the stator windings, wherein:

each one of the stator windings is connected to one of the m outputs, and the network distributes to the stator windings a current applied at one of the n inputs in order to set one of the first plurality of positions that is assigned to a respective one of the n inputs.

2. The rotary actuator according to claim 1, wherein:

the permanently magnetized rotor includes a magnet that is aligned so as to be perpendicular to a rotational axis.

3. The rotary actuator according to claim 1, wherein:

the stator windings are uniformly distributed around a rotational axis in a circumferential direction.

4. The rotary actuator according to claim 1, further comprising:

a ring core surrounding the permanently magnetized rotor and on which the stator windings are arranged.

5. The rotary actuator according to claim 1, wherein:

the number m of the stator windings is smaller than the number n of the first plurality of positions.

6. The rotary actuator according to claim 1, wherein:

the arrangement for exerting the corrective torque includes a plurality of permanent magnets.

7. The rotary actuator according to claim 1, wherein:

a resistance of all n inputs is the same.

8. The rotary actuator according to claim 1, wherein:

the stator windings include three stator windings, and the plurality of first positions includes four first positions.

9. The rotary actuator according to claim 1, wherein:

adjoining target positions have an angular distance of 45°.

10. The rotary switch according to claim 1, wherein:

the rotary switch is an "R"-type waveguide switch.

11. The rotary actuator according to claim 1, wherein:

the arrangement includes a plurality of elements that are arranged in an asymmetric manner about a longitudinal axis of the rotary actuator.

12. A rotary switch, comprising:

a rotary actuator that includes:

a permanently magnetized rotor;

a plurality of stator windings surrounding the permanently magnetized rotor in a rim-like fashion and for generating a magnetic field, the stator windings placing the permanently magnetized rotor in one of a first plurality of positions, wherein the stator windings are coplanar and arranged so as to be unpaired;

an arrangement for exerting a corrective torque on the permanently magnetized rotor, the arrangement for exerting the corrective torque, in a currentless state of the stator windings, placing the permanently magnetized rotor in a target position of a second plurality of positions, each position of the first plurality of positions having assigned thereto a corresponding one of the second plurality of positions as the target position; and a network having n inputs and m outputs, n being a number of the first plurality of positions and m being a number of the stator windings, wherein:

each one of the stator windings is connected to one of the m outputs, and the network distributes to the stator windings a current applied at one of the n inputs in order to set one of the first plurality of positions that is assigned to a respective one of the n inputs.

* * * * *